March 14, 1967   O. J. B. ORWIN   3,308,768
CONVEYORS FOR CONVEYING GOODS
Filed June 29, 1965   5 Sheets-Sheet 1
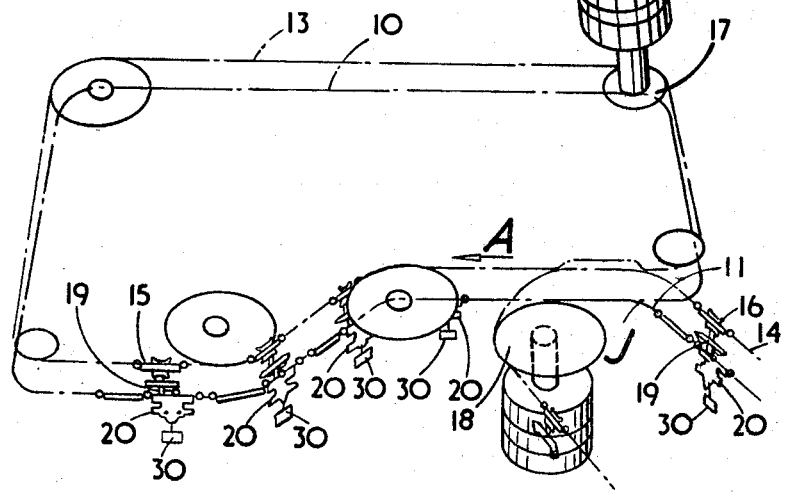
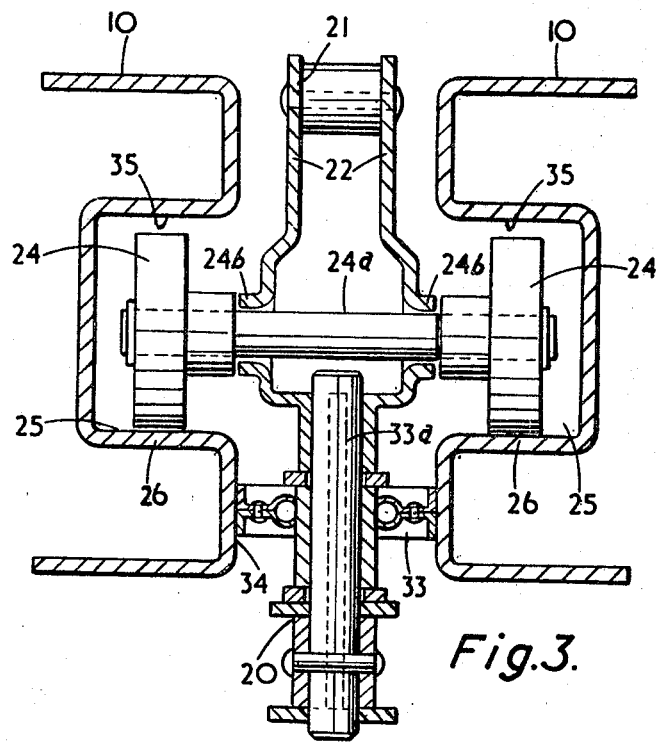
INVENTOR.
OLAF JOHN BARCLAY ORWIN
BY Kurt Kelman
Agent March 14, 1967  O. J. B. ORWIN  3,308,768
CONVEYORS FOR CONVEYING GOODS
Filed June 29, 1965  5 Sheets-Sheet 2

INVENTOR.
OLAF JOHN BARLAY ORWIN
BY Kurt Kelman
Agent

March 14, 1967

O. J. B. ORWIN 3,308,768

CONVEYORS FOR CONVEYING GOODS

Filed June 29, 1965

INVENTOR.

OLAF JOHN BARCLAY ORWIN

BY Kurt Kelman
Agent

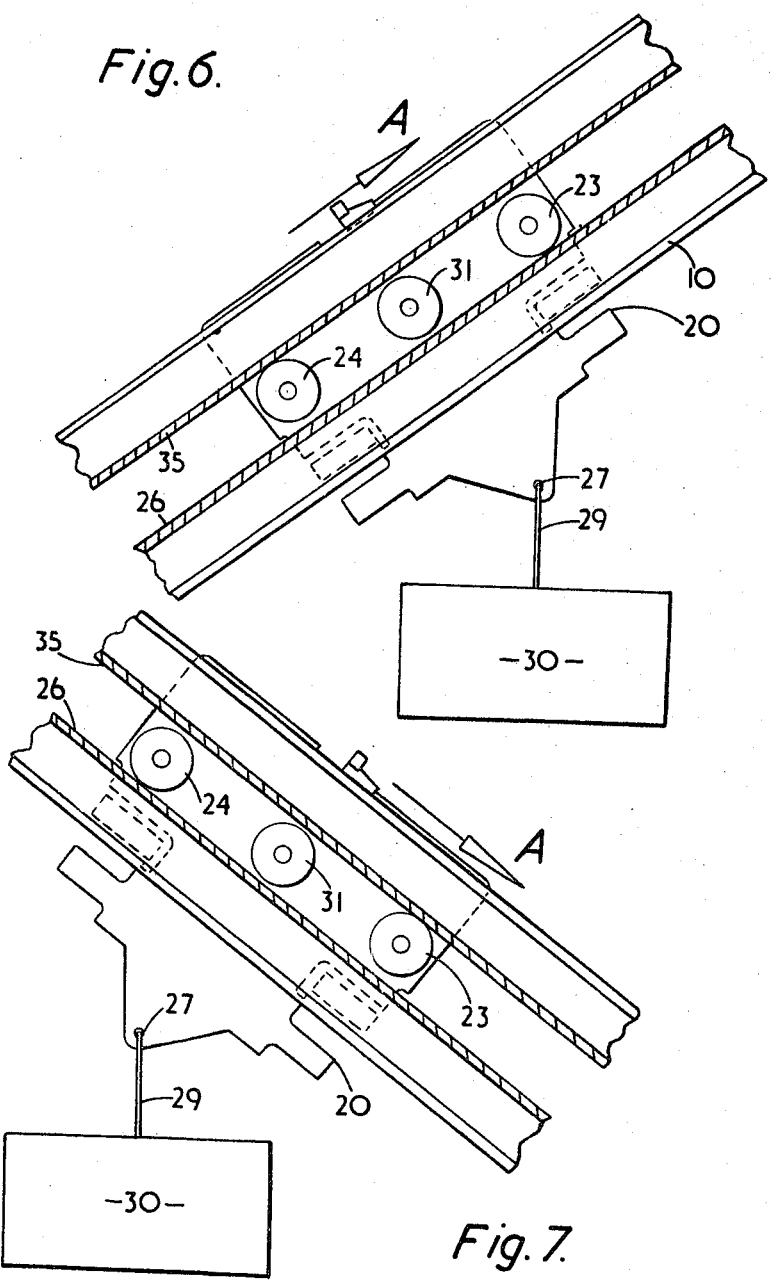

INVENTOR.

OLAF JOHN BARCLAY ORWIN

BY Kurt Kelman
Agent

United States Patent Office 3,308,768
Patented Mar. 14, 1967

3,308,768
CONVEYORS FOR CONVEYING GOODS
Olaf John Barclay Orwin, Quinton, Birmingham, England, assignor to Fisher & Ludlow Limited, Tipton, England, a British company
Filed June 29, 1965, Ser. No. 467,958
Claims priority, application Great Britain, July 7, 1964, 27,858/64; May 1, 1965, 18,425/65
7 Claims. (Cl. 104—172)

This invention relates to conveyors for conveying goods, comprising a plurality of wheeled goods supporting trolleys each having a front and rear end with a pair of trolley supporting wheels adjacent both ends. The two wheels in each pair are spaced transversely apart from one another, and are mounted for rotation about a common substantially horizontal axis, with the axes of the two pairs of wheels being parallel or substantially parallel to one another. The trolleys are arranged to be power advanced by means of a powered driving element, along a trolley track provided with load supporting surfaces with which said trolley supporting wheels engage, and are further provided with track engaging guide wheels spaced relatively apart in the direction of advancement of the associated trolley and rotatable about a substantially vertical axis and engageable on diametrically opposite sides with correspondingly disposed guide surfaces provided by the trolley track for guiding the trolley in a lateral sense relative to the track. Usually such guide wheels are disposed adjacent each end of the trolley adjacent the axis of rotation of each pair of supporting wheels. Also, the trolley track may frequently be of cruciform configuration in cross section, so as to embody horizontally extending flanges which provide the load supporting surfaces which engage the trolley supporting wheels, and to embody vertically extending guide flanges adapted to engage with the guide wheels on opposite sides thereof.

In conveyors of this kind, if only one guide wheel is provided as above described adjacent each end of the trolley it is necessary that the axes of rotation of the two pairs of trolley supporting wheels should be maintained parallel to one another, so that each such axis is maintained perpendicular to the direction of trolley advancement, and thus ensure absence of skidding between the two pairs of trolley supporting wheels and the trolley track when the trolleys advance along the straight sections of the trolley track, the major part of the length of which is usually straight. Although in such an arrangement the two guide rollers effectively guide the trolley around sections of the trolley track which are curved in a horizontal plane, as the two pairs of trolley supporting wheels rotate about mutually parallel axes, substantial skidding of these wheels relative to the track occurs during the traversing of such horizontal curves in the trolley track, and in particular during the traversing of movable switch tongues when passing through the junction between two relatively inclined track sections, i.e. at a turn-out between a main and a branch track. As these trolley supporting wheels carry the weight of the trolley and load, this skidding has the undesirable effect of both wearing the track unduly rapidly at such positions, as well as of wearing the supporting wheels themselves, and also of increasing substantially the resistance to advancement of the trolleys during their passage around these curved portions of the track and through the track junctions aforementioned, so that the load on the trolley driving element such as an endless chain is greater than would otherwise be necessary.

With a vew to avoiding the disadvantages of the foregoing arrangement, I devised more than ten years ago a modification of such a conveyor, in which each of the two pairs of trolley supporting wheels were mounted on the trolley through supporting bodies, each capable of pivotal movement relative to the trolley about a vertical axis coincident with the axis of rotation of the adjacent guide wheel, each of the so pivoted bodies being provided with a second guide wheel mounted on the body for rotation about a vertical axis situated to the rear of both the axis of rotation of the adjacent pair of trolley supporting wheels and to the rear of the vertical axis of pivoting of the aforesaid wheel carrying body, the arrangement being such that each pair of trolley supporting wheels was free to pivot about a vertical axis relative to the trolley body under the control of the rearmost of the adjacent two guide wheels, so as to permit of the axis of rotation of the trolley supporting wheels being always aligned with the centre of curvature of horizontally curved track portions or switches, thereby avoiding skidding of the trolley supporting wheels at these positions.

Although this modified arrangement avoids the above referred to disadvantages of conveyors of the kind specified, it nevertheless involves a number of serious disadvantages as follows:

(a) In order that the pivotally mounted wheel carrying bodies should be self-aligning in relation to the trolley track, it is necessary that the axis of rotation of each pair of trolley supporting wheels should be disposed to the rear of the vertical axis of pivoting of their supporting body, so that the trolley wheels exert a castering action on their associated bodies. Since the trolley supporting wheels carry the weight of the trolley plus load, this means that the vertical pivot in each wheel carrying body is subjected to an appreciable bending movement which is liable to cause relatively rapid wear of such pivot bearings, with a resultant tendency for the trolley, as wear and resultant clearance increases, to occupy a progressively increasing downward position relative to the trolley track, with consequent interference with the driving connection to the trolleys from the power driven element. Usually, such driving connection comprises a trolley driving dog which depends from a driving element in the form of a chain arranged immediately above the trolley track, and such progressive lowering of the trolley consequent on the aforementioned wear is liable to impair the engagement between the driving dog and the trolley, with consequent failure of the operation of the conveyor.

(b) To reduce the rate of wear above mentioned, it is necessary to provide anti-friction bearings in the aforementioned vertical wheel supporting body pivots, and these and the necessity for providing these pivotal mounted bodies increases very considerably the total cost of each trolley, and thus the overall cost of the conveyor.

(c) As the guide wheels are adapted for guiding engagement on each of two diametrically opposite sides with correspondingly disposed guide surfaces of the trolley track, the provision of a second guide wheel adjacent each pair of trolley supporting wheels increases appreciably the resistance to advancement of the trolleys, which has a serious effect where, as is commonly required, the trolleys are gravity advanced through a junction between two trolley tracks immediately after disconnection of the drive to the trolley from one of the powered driving elements, with the result that the trolleys are liable undesirably to come to rest in or adjacent these junctions with consequent intereference with the intended operation of the conveyor.

Although these disadvantages have been known for more than ten years, and although conveyors embodying this modification have been supplied on a substantial scale during that period, nevertheless it is not until the present invention that it has been possible to avoid the disadvantages of both types of conveyors.

The present invention provides a conveyor in which the trolleys are provided intermediate the two pairs of trolley supporting wheels, with an intermediate pair of wheels mounted for rotation about an axis parallel or substantially parallel to the axes of rotation of the trolley supporting wheels, with the two pairs of trolley supporting wheels disposed or adapted to be disposed in a position relative to the intermediate wheels in which a flat plane tangential to the track engaging undersides of the two pairs of trolley supporting wheels is a short distance above the track engaging underside of the intermediate pair of wheels, considering the trolley loaded with the axis of rotation of the intermediate wheels in or substantially in a vertical plane perpendicular to the direction of trolley advancement and within which plane lies the load reaction of the weight of the supported goods on the trolley, so that considering the trolley advancing horizontally, at least the major part of the trolley load is supported from the trolley track through said intermediate wheels, the arrangement permitting of the two pairs of trolley supporting wheels moving laterally relative to the trolley track, with no or substantially less skidding than is the case with a similarly loaded trolley in which no intermediate wheels are provided.

Preferably the arrangement is such that the axis of rotation of the intermediate pair of wheels is vertically aligned with the centre of gravity of the trolley plus load, considering the trolley horizontal. In such preferred arrangement, with the trolley advancing along a horizontal track, the whole of the weight of the trolley load will be borne by the intermediate wheels, leaving the other two pairs of supporting wheels at the front and rear ends of the trolley substantially free to slide transversely relative to a horizontally curved track, without being in load transmitting engagement therewith at all, apart from any reaction thrust which may be transmitted to one or the other pairs of trolley supporting wheels, for instance to the front trolley supporting wheels, from the driving engagement between the powered driving element and the trolley. Such reaction thrust on a horizontal track is usually very small in comparison with the weight of the supported load. Thus in the preferred arrangement aforementioned wear of the track and wheels, as well as the temporarily increased load on the driving element, consequent on the traversing of a horizontally curved portion of the trolley track, is minimized as compared with the above described arrangement of conveyors of the kind specified, in which the two pairs of trolley supporting wheels rotate about axes which are fixed in mutually parallel relationship.

By the expression "a short distance above" is herein meant a distance large enough to permit of said lateral movement of the two pairs of trolley supporting wheels, but not so large as to prevent the trolley supporting wheels restraining the trolley against uncontrolled tilting relative to the track about a transverse axis when the trolleys are traversing uphill or downhill sections of the trolley track.

Such short distance in practice will not exceed 6.5 mms. and will usually be within the range of 1.5 mms. to 6.5 mms. and desirably is not more than about 3.25 mms.

In addition to substantially reducing wear due to skidding, the present invention enables a simple mounting to be provided for both the intermediate pair of wheels and the trolley supporting wheels, in which each of these pairs of wheels may be carried directly through supporting spindles on the trolley, so that the cost of each wheel mounting may be kept as low as possible, while at the same time unlike the previously developed modified construction, it is necessary only to provide two guide wheels in all. Thus, the additional cost of providing the two intermediate load supporting wheels may be substantially offset by the elimination of two of the four guide wheels previously provided.

In one arrangement the two pairs of trolley supporting wheels may have their undersides disposed at all times at a horizontal level, considering the trolley horizontal, which is a short distance above the underside of the intermediate wheels as by making the diameter of the intermediate wheels slightly greater than that of the trolley supporting wheels or by arranging their axis of rotation at all times slightly below the level of the axis of rotation of the trolley supporting wheels, considering the trolley horizontal.

Preferably, however, the undersides of the trolley supporting wheels are merely adapted to be disposed a short distance above the underside of the intermediate pair of wheels by mounting one, or preferably both pairs of trolley supporting wheels for limited vertical floating movement relative to the trolley. Desirably both pairs of trolley supporting wheels are so mounted to enable them also on their upper sides, despite manufacturing imperfections particularly on the trolley track, effectively to engage with an upper downwardly facing track surface, e.g. trolley track upper flange, and thus maintain the longitudinal axis of the trolley parallel or substantially parallel to the adjacent portion of the trolley track when traversing relatively steep uphill or downhill portions of the track.

With a trolley advancing in a horizontal direction, the supporting of at least the major part of the trolley load from the intermediate pair of wheels, and the whole of the trolley load, if the centre of gravity of the trolley plus load is aligned with the intermediate pair of wheels, is ensured by the above described relative disposition provided or obtainable between the underside of the intermediate pair of wheels and the undersides of the two pairs of trolley supporting wheels. Thus, in traversing a horizontally extending trolley track, including a horizontally curved portion thereof, only the intermediate pair of wheels may be in load supporting engagement with the track, with the other two pairs of wheels at the front and rear of the trolley, where fixed against any vertical movement, only lightly touching the track during periods of load oscillation in a fore and aft direction, which is liable to occur from time to time, or with the trolley supporting wheels rolling on the track without supporting any part of the trolley load, in the case where they are mounted for vertical floating movement.

Where only one pair of trolley supporting wheels is mounted for vertical floating movement, it would be necessary for the centre of gravity of the horizontal trolley plus load to be vertically aligned with the axis of rotation of the intermediate wheels if no part of the trolley load is to be carried by the pair of trolley supporting wheels not mounted for vertical floating movement. Under these circumstances, the mounting of the one pair of trolley supporting wheels for vertical floating movement would permit of the trolley swinging very slightly about the axis of the intermediate pair of wheels, so as to ensure that these still supported the whole of the trolley load.

As used herein the expressions "front," "rear" and "rearmost" have reference to the designed advancement of the trolley along the trolley track, as determined by the designed direction of advancement of the driving element of the conveyor system.

The invention is illustrated in the accompanying drawings wherein:

FIGURE 1 is a diagrammatic view of one form of conveyor embodying wheeled trolleys according to this invention.

Figure 2:
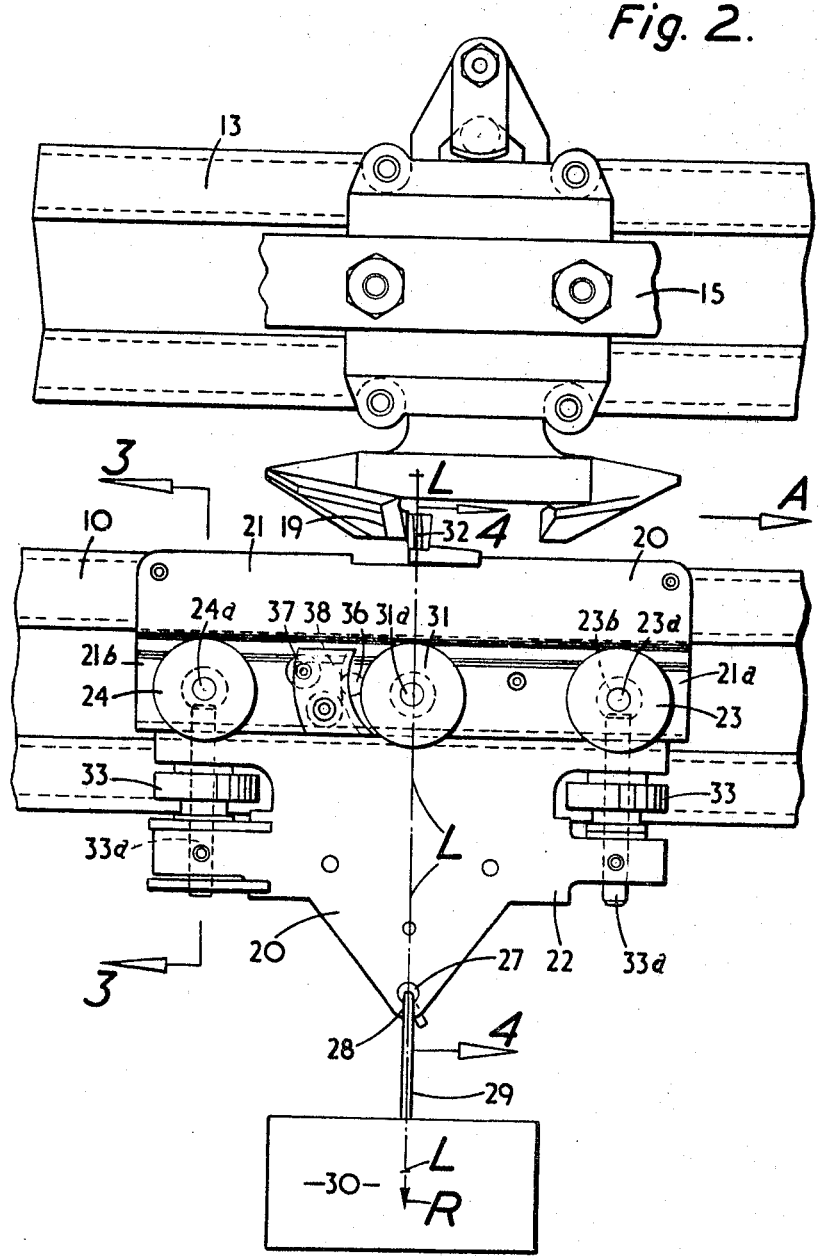
FIGURE 2 is a side elevation of part of the conveyor shown in FIGURE 1, illustrating one of the wheeled trolleys.
Figure 4:
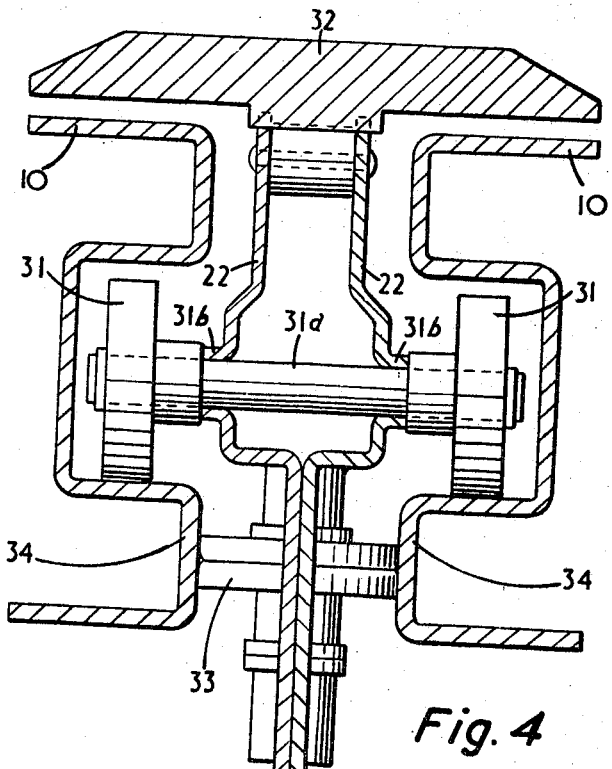

FIGURES 3 and 4 are sectional views to an enlarged scale on the lines 3—3 and 4—4 respectively of FIGURE 2.

Figure 5:
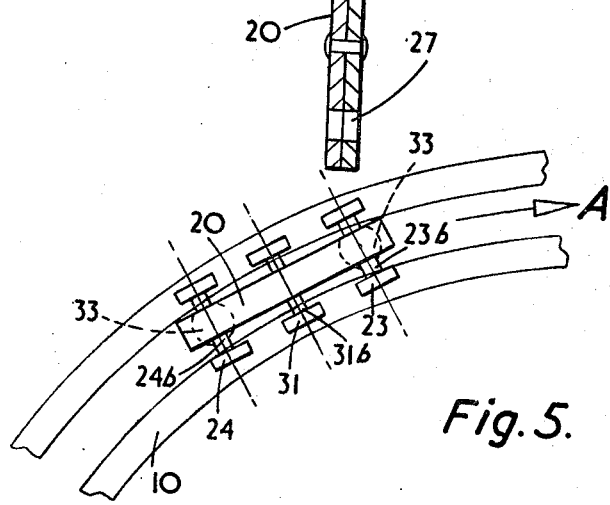

FIGURE 5 is a plan view illustrating how one of the trolleys shown in FIGURE 2 traverses a trolley track which is curved in a horizontal plane.

FIGURES 6 and 7 are side elevations showing in diagrammatic form the load distribution between the track and the wheels of the trolley depicted in FIGURE 2 as this respectively traverses a steep uphill and a steep downhill gradient.

Figure 8:
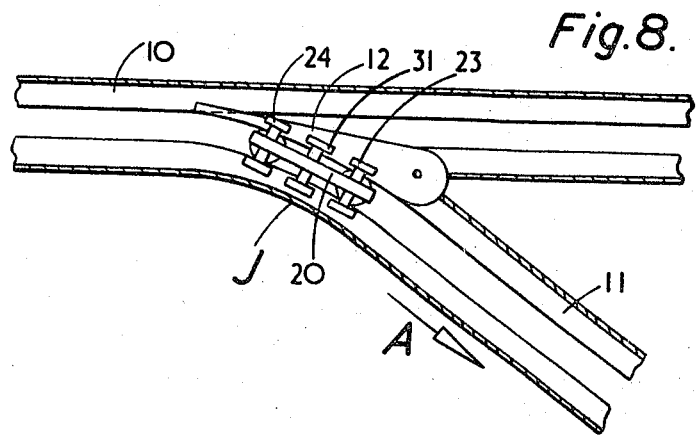

FIGURE 8 is a sectional plan view in diagrammatic form illustrating how one of the trolleys shown in FIGURE 2 traverses a junction between main and branch trolley tracks.

Figure 9:
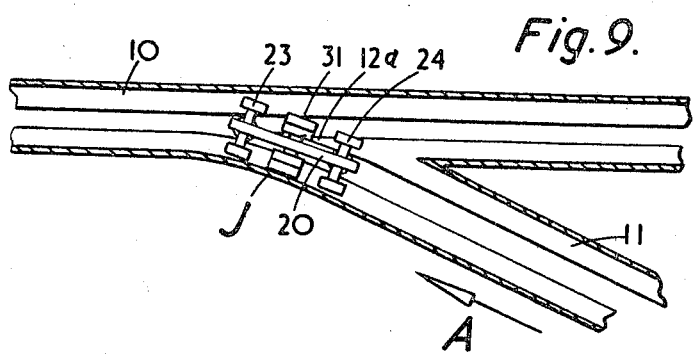

FIGURE 9 is a view similar to FIGURE 8 showing a modification.

The conveyor illustrated in FIGURES 1 to 8 of the drawings comprises a main trolley track 10 and a branch trolley track 11, the junction J between which is provided as shown in FIGURE 8 with the usual movable track switch tongue 12, the operation of which is controlled in any suitable manner forming no part of this invention.

Each of the trolley tracks 10, 11 is of cruciform configuration in cross-section as depicted in FIGURES 3 and 4.

Disposed above each of the two trolley tracks 10, 11 and extending parallel thereto is a chain supporting track 13, 14 respectively, in each of which runs a driving element 15, 16 respectively, in the form of an endless chain and driven in the usual way from powered driving sprockets 17, 18 in FIGURE 1.

Each driving element 15, 16 is provided with a number of dependant trolley driving dogs 19.

The conveyor is provided with a plurality of wheeled goods supporting trolleys 20 each comprising a generally rectangular body 21 formed as a pair of vertically disposed metal plates 22 connected together in side by side parallel relationship.

The trolley body 21 at a position intermediate its upper and lower edges is provided at both its front and rear ends 21a, 21b with a pair of trolley supporting wheels 23, 24 respectively, each wheel being of similar cylindrical configuration so as each to be the same peripheral diameter. The two wheels in each pair are spaced transversely apart from one another and mounted for rotation about a common substantially horizontally extending spindle 23a, 24a with the two spindles, and thus the axes of rotation of their respective pairs of wheels 23, 24 being substantially parallel to one another.

Each pair of wheels 23, 24 is adapted to engage with load supporting surfaces 25 provided by the upper faces of the lower horizontal flanges 26 of the cruciform section trolley tracks 10, 11.

Each trolley body 21 at a position halfway between the two pairs of load supporting wheels 23, 24 is provided in its lower portion substantially below the level of the underside of said wheels with a transverse hole 27 in which engages the upper end 28 of a load supporting suspension hook 29 on which is carried the goods 30 constituting the load to be supported and conveyed by the trolley.

The upper end 28 of each hook 29 is free to swing about a horizontal transverse axis within hole 27 and relative to trolley body 21. Thus, when the trolley 20 is advancing in a horizontal direction along a horizontally disposed portion of trolley track as depicted in FIGURE 2, the goods supporting hook 29 will be vertically dependent and the load reaction R of the weight of the supported goods on the trolley will pass along, i.e. will lie within the vertical plane L—L perpendicular to the direction A of trolley advancement, which vertical plane passes through the centre of hole 27 and thus lies halfway between the axes of rotation of the front and rear pairs of trolley supporting wheels 23, 24.

At the same time when the trolley is advancing uphill or downhill as shown in FIGURES 6 and 7 respectively, the suspension hook is free to remain in a vertically dependant position swinging relatively to the trolley body about hole 27 so that the suspension hook is not thereby subjected to bending movement.

In accordance with this invention, each trolley 20 at a position intermediate the two pairs of trolley supporting wheels 23, 24 is provided with a pair of intermediate wheels 31 of diameter and shape the same as that of the wheels 23, 24, and mounted for rotation upon opposite ends of a spindle 31a which extends parallel to the mean position of spindles 23a, 24a through the trolley body 21 at a position which is vertically above the suspension hook hole 27. Thus the intermediate pair of wheels are mounted for rotation about an axis substantially parallel to that of the trolley supporting wheels 23, 24, and considering the trolley horizontal with their axis of rotation in the said vertical plane L—L containing the load reaction R of the weight of the goods 30 on the trolley.

The two plates 22 constituting the trolley body 21 are spaced relatively apart in their upper portions which receive therebetween at a position vertically above the suspension hook hole 27, the dependant stem of a T-shaped trolley driving bar 32 which is engageable by the power advance chain dogs 19 at a position which lies at short distance, e.g. 0.5 cm. to the rear of the vertical plane L—L. The arrangement is such that the dogs 19 by their engagement with the bars 32 push the trolleys 20 in the known manner along their supporting track.

The two plates 22 in their upper portions are formed with integral outwardly extending bushes 23b, 24b, 31b the central horizontal axes of which are disposed in the same plane, which is horizontal with the trolley horizontal. These bushes support the spindles 23a, 24a and 31a respectively.

The intermediate wheel spindle 31a is a tight fit in the corresponding pair of bushes 31b, so that the intermediate pair of wheels 31 are incapable of any vertical movement relative to the associated trolley body 21. Slight clearance is, however, provided between the spindles 23a, 24a and their respective bushes 23b, 24b, so that the two pairs of trolley supporting wheels 23, 24 each have a limited vertical floating movement relative to the trolley body 21 through an overall range of 6.5 mms. or preferably 3.25 mms. in either direction from the mean position.

Thus the two pairs of trolley supporting wheels 23, 24 are adapted to be disposed in a raised position relative to the intermediate wheels 31 in which a flat plane tangential to their track engaging undersides is a short distance above (as earlier defined) the track engaging underside of the intermediate pair of wheels 31, considering the trolley advancing horizontally along a horizontal portion of the supporting trolley track.

The arrangement is accordingly such that when a loaded trolley is so advancing horizontally, the whole of the load will be borne by the pair of intermediate wheels 31, the axis of rotation of which then lies in the vertical plane L—L which also then contains the line of the load reaction R aforementioned, and in fact the centre of gravity of the trolley and load assuming as illustrated the trolley is of symmetrical form.

Under these circumstances although the two pairs of trolley supporting wheels 23, 24 will still have rolling engagement with the trolley track load supporting flanges 26, they will not support any part of the weight of the trolley body or of the load 30, since the upper sides of their spindles 23a, 24a will be out of load transmitting engagement with the corresponding bushes 23b, 24b on the trolley body, i.e. the trolley supporting wheels 23, 24 are free to be disposed in the aforementioned raised position relative to the intermediate wheels 31.

Thus with the so loaded trolley advancing as shown in FIGURE 5 along a track which is curved in a horizontal plane, the pair of intermediate wheels 31 are free to follow exactly the curvature of the track, i.e. to move in a curved path having its centre coincident with the centre of curvature of the track without any skidding at all between the wheels 31 and the track flanges 26. The other two pairs of trolley supporting wheels 23, 24, which rotate about axes substantially parallel to that of wheels 31 but which are spaced in a fore and aft direction relative to wheels 31, will necessarily have their axes of rotation inclined to the radius of curvature of that part of the track with which they are momentarily in light engagement, and will accordingly slide as well as roll relative to the track. This sliding they are quite free to do without appreciable wear of the track or of these wheels 23, 24, since the latter are not in load transmitting engagement with the track.

Each trolley 20 is provided at the front and rear ends thereof with a track engaging guide wheels 33 rotatable about a vertical axis, each of which engage with vertical guide flanges 34 of the trolley track, so as to guide the trolley in a lateral sense relative to the track, particularly when traversing horizontal curves as above described, each guide wheel being supported on a vertical spindle 33a secured between the two body plates 22.

Although in traversing a horizontally extending track, only the intermediate pair of wheels 31 need be in load supporting engagement therewith, it is necessary still to provide both a pair of front and also a pair of rear trolley supporting wheels 23, 24, in addition to the intermediate wheels, to take care of the traversing of uphill and downhill sections of the trolley track, which are commonly required in installations of conveyor systems of this kind.

In traversing non-horizontal portions of the trolley track, in which the track is inclined at a relatively small angle, e.g. up to about 30° to the horizontal, the centre of gravity of the load and trolley will usually be displaced in a direction longitudinally of the trolley relative to the axis of rotation of the intermediate pair of wheels, so that the weight of the trolley plus load must now be carried not only by the intermediate pair of wheels, but also by either the front or the rear pair of load supporting wheels, according to which of these is nearest in a longitudinal sense to the centre of gravity.

Thus, with a track inclined to the horizontal at a relatively small angle as above described, in traversing an uphill portion of the track the load would be supported by the front pair of trolley supporting wheels 23 and the intermediate pair of wheels 31, and in traversing a downhill portion of the track the load would be supported by the intermediate wheels 31 and the rear pair of trolley supporting wheels 24.

In traversing uphill or downhill portions of the trolley track, in which the inclinations of the track to the horizontal are relatively steep, i.e. greater than about 30°, e.g. of the order of 45° or 60°, the load would be supported in the manner above described, but by reason of the aforementioned displacement longitudinally of the centre of gravity of the load and trolley, to maintain the longitudinal axis of the trolley parallel or substantially parallel to the length of the adjacent inclined portion of the trolley track, it is necessary that the latter should apply a downward reaction to the trolley. This may be done by providing a second pair of wheels or a pair of rollers beneath both the front and rear trolley supporting wheels 23, 24, this front second pair engaging the underside of the trolley track when traversing downhill, and the rear second pair so engaging when the trolley is traversing uphill.

Usually, however, to avoid the provision of these additional pairs of wheels or rollers, it will be found more convenient to provide a trolley track of cruciform configuration in cross-section as illustrated in FIGURES 3 and 4, and to obtain the required downward reaction by engagement between the upper side of the rear or front pair of trolley supporting wheels 23, 24 respectively (according to whether the trolley is going uphill or downhill), and the upper downwardly directed flanges 35 of the cruciform shaped trolley track. The foregoing is shown respectively in FIGURES 6 and 7.

Such engagement between the front and rear pair of trolley supporting wheels 23, 24 and the trolley track is ensured, despite irregularities and imperfections resulting from manufacturing tolerances, by the aforesaid mounting of the front and rear pair of trolley supporting wheels for limited vertical floating movement relative to the trolley body 21.

Where, as above described, slight clearance is provided between the trolley supporting wheels spindles 23a, 24a and their respective bushes 23b, 24b, this will of necessity allow these trolley supporting wheels 23, 24 to rotate about axes which are not exactly parallel to one another, i.e. merely substantially parallel to one another and to the axis of rotation of the intermediate pair of wheels 31, but this departure from exact parallelism does not interfere with the foregoing function of the trolley supporting wheels in traversing uphill and downhill sections of the trolley track. In the alternative arrangement above mentioned, in which the trolley supporting wheels are not mounted for vertical floating movement, then the axis of rotation of the two pairs of these wheels 23, 24 will be precisely parallel to one another and to the axis of rotation of the intermediate pair of wheels 31.

Although with the present invention, when traversing relatively steep uphill and downhill portions of the track, the trolley as in the prior arrangement, cannot traverse a horizontally curved portion of the track without skidding; this does not usually matter, as in practice, in order to minimize the maximum loading on the driving chain, uphill and downhill trolley track sections are normally not curved in a horizontal or transverse sense, so that no problem of skidding arising from such lateral curvature arises. Trolleys in accordance with the present invention can similarly without skidding of the front and rear trolley supporting wheels traverse the curved moveable switch tongues 12 provided at the trolley track junctions J in the manner shown in FIGURE 8 of the drawings. As in conveyors of the kind specified, wear of these moveable switch tongues is a particularly serious problem, such a feature of the present invention is of especial importance.

In FIGURE 9 is illustrated a modification of the trolley depicted in FIGURES 2 to 8, which enables the trolley to traverse in a trailing or converging direction, as denoted by the direction of arrow A in this figure, a junction between two trolley tracks without it being necessary to provide such junction with a moveable track switch tongue as shown at 12 in FIGURE 8, and which as shown in FIGURE 9 is replaced by a fixed tongue 12a. For this purpose, the two intermediate wheels 31 of each trolley are each made of a width substantially greater than, namely at least twice that of each of the trolley supporing wheels 23, 24, either by making each intermediate wheel 31 as a single very wide wheel, or as shown, and to facilitate interchangeability in manufacture as two separate adjacent wheels 31, each of which has the same width as that of each of the wheels 23, 24. The overall width of each so provided wide intermediate wheel 31 is made sufficiently great as to ensure that when the trolley traverses the junction J between the branch track 11 and the main track 10, one end of each wide intermediate wheel will at a position directly beneath its axis of rotation have engaged with the adjacent flange 26 of track 10 while the opposite end of such wide intermediate wheel at a position vertically below its axis of rotation is still supported by the fixed junction tongue 12a. Any tendency for the trolley to rock over as it approaches the position illustrated in FIG. 9 is prevented by the additional support provided by wheels 23, 24. Thus, by providing these intermediate wheels 31 and making them of the wider width here described, it is possible at converging as opposed to diverging or facing junctions to effect a substantial saving in expense by replacing the relatively expensive moveable switch tongues by fixed tongues 12a, which are merely formed much more cheaply as an integral part of the cruciform section trolley track.

With the various constructions above described, any suitable known or other arrangement not illustrated may be provided for disconnecting the drive between the chain dogs 19 and the trolley driving bars 32 so as to effect controlled arresting of the loaded trolleys at positions spaced relatively apart at predetermined locations along the trolley tracks. For this purpose the trolleys may be provided with braking means of known form for preventing the trolleys that are brought to rest on horizontal sections of the trolley track moving undesirably in a direction opposite to their designed direction of advancement, as denoted by arrow A in FIGURE 2. One such known form of braking means may as shown be of the free wheel type comprising a ball 36 working between the cylindrical periphery of a pair of trolley wheels and a braking element 37 having a braking surface 38 in the form of a channel section groove, the base of which is engageable by the ball 36 and is eccentric in relation to the axis of rotation of the adjacent trolley wheel. The arrangement is such that when the trolley tends to advance in a direction opposite to the designed direction as denoted by arrow A, the balls 36 become wedged between the base of groove 38 and periphery of the trolley wheel so as to inhibit such reverse movement of the trolley.

In the arrangement illustrated, the braking means are provided only in respect of the intermediate wheels 31. This is important because in the case where the trolleys are advanced uphill or downhill in the manner shown in FIGURES 6 and 7, the trolley supporting wheels 23, 24 where they engage with the upper horizontal flanges 35 are necessarily rotated by such engagement in an opposite direction to their designed direction of rotation, and this would have the effect of undesirably braking such trolley wheels if the braking means were provided thereon. As shown in FIGURES 6 and 7, the intermediate wheels 31 do not come in contact with the flanges 35, so that there is no danger of these intermediate wheels being undesirably rotated in the reverse direction.

What I claim then is:

1. A conveyor comprising a plurality of wheeled goods supporting trolleys each having a front and rear end, a pair of trolley supporting wheels adjacent each end, the two wheels in each pair spaced transversely apart from one another and mounted for rotation about a common substantially horizontal axis, with the axes of the two pairs of wheels being substantially parallel to one another, a supporting track for said trolleys having an upwardly directed load supporting surface engageable with said pairs of trolley supporting wheels, a power driven element adapted to advance said trolleys along said track, each trolley having a pair of guide wheels rotatable about a vertical axis, with the two guide wheels of each pair being spaced longitudinally from one another, and each engageable with said trolley track, a pair of intermediate wheels on each trolley disposed between the two pairs of trolley supporting wheels, means mounting said intermediate wheels for rotation about an axis substantially parallel to the axes of rotation of the trolley supporting wheels, and means mounting each of the two pairs of trolley supporting wheels in a position in which a flat plane tangential to the track engaging undersides of the two pairs of trolley supporting wheels is a short distance above the track engaging underside of the intermediate pair of wheels, the axes of rotation of the intermediate wheels being substantially in a vertical plane perpendicular to the direction of trolley advancement when the trolley is loaded, and within which vertical plane lies the load reaction of the weight of the supported goods on the trolley, whereby at least the major part of the load is supported from the trolley track through said intermediate wheels when the trolley advances horizontally.

2. A conveyor according to claim 1 wherein the axis of rotation of the intermediate pair of wheels is vertically aligned with the center of gravity of the trolley when the trolley is horizontal.

3. A conveyor according to claim 1 wherein the two pairs of trolley supporting wheels are mounted for limited vertical movement about the axis of said pair of intermediate wheels so as each to be adapted to be disposed in a position in which considering the trolley horizontal a flat plane tangential to the track engaging undersides of the two pairs of trolley supporting wheels is disposed a short distance above the underside of the pair of intermediate wheels.

4. A conveyor according to claim 3 and wherein the two pairs of trolley supporting wheels and the pair of intermediate wheels are all of the same outside diameter and mounted for rotation on opposite ends of an associated supporting spindle, with the spindles being each of the same diameter, further characterised in that the trolley body is formed as a pair of vertically disposed plates in side by side relationship, each plate being formed with integral transversely aligned oppositely extending bushes, the centres of which are all disposed at the same horizontal level considering the trolley horizontal, which bushes receive the spindles, with the spindles carrying the intermediate wheels and the spindles carrying the trolley supporting wheels being respectively a tight and free fit in their respective bushes.

5. A conveyor according to claim 3 and wherein the trolley track embodies vertically spaced flanges the lower of which flanges provides an upwardly directed load supporting face for supporting the undersides of the intermediate wheels and of the trolley supporting wheels when traversing uphill or downhill portions of the trolley track, further characterised in that the upper sides of the trolley supporting wheels are adapted to engage with the upper flanges of the trolley track when the trolley is traversing a relatively steep uphill or downhill portion of the trolley track.

6. A conveyor according to claim 5, and wherein the trolley is provided with braking means acting on the trolley wheels in such a manner as to inhibit movement of the trolley in a direction the reverse of its designed direction of advancement, characterised in that the braking means is arranged to operate only on each of the intermediate wheels.

7. A conveyor according to claim 1 wherein the trolley track comprises a main track and a branch track with a junction embodying a track tongue disposed between the two tracks for supporting the trolley wheels at a converging or trailing junction, further characterised in that the track tongue is formed as a fixed as opposed to a moveable tongue and that the two intermediate wheels of each trolley each have a width substantially greater than that of each trolley supporting wheel, such that in passing from the branch track to the main track, the undersides of the intermediate wheels at a position vertically beneath their axes of rotation span the track gap between the fixed track tongue and the adjacent load supporting surface of the main track at the side thereof opposite to the fixed track tongue.

References Cited by the Examiner

UNITED STATES PATENTS 3,101,678   8/1963   Grube _____ 104—95
3,202,259   8/1965   Orwin _____ 198—177

EVON C. BLUNK, *Primary Examiner.*

RICHARD E. AEGERTER, *Examiner.*